United States Patent [19]

Schenz

[11] Patent Number: 4,479,974

[45] Date of Patent: Oct. 30, 1984

[54] AMINO ACIDS AS DRY BEVERAGE MIX INGREDIENTS

[75] Inventor: Anne F. Schenz, Haworth, N.J.

[73] Assignee: General Foods Corporation, White Plains, N.Y.

[21] Appl. No.: 435,162

[22] Filed: Oct. 19, 1982

[51] Int. Cl.$^3$ .............................................. A23L 2/00
[52] U.S. Cl. .................................... 426/590; 426/656
[58] Field of Search ........................ 426/590, 650, 656

[56] References Cited

U.S. PATENT DOCUMENTS

| | | | |
|---|---|---|---|
| 3,395,021 | 7/1968 | Glicksman et al. | 426/98 |
| 3,510,310 | 5/1970 | Breckwoldt | 426/548 |
| 3,649,298 | 3/1972 | Kreevoy et al. | 426/590 |
| 3,736,150 | 5/1973 | Basso et al. | 426/591 |
| 3,821,432 | 6/1974 | Mohammed | 426/590 |
| 4,038,421 | 7/1977 | Mendy et al. | 426/590 |

*Primary Examiner*—Raymond Jones
*Assistant Examiner*—Elizabeth C. Weimar
*Attorney, Agent, or Firm*—Linn I. Grim; Thomas A. Marcoux; Daniel J. Donovan

[57] ABSTRACT

A method is disclosed for producing an enhanced flavor impact and improved mouthfeel character in a fruit-flavored dry beverage mix which comprises adding a low level of an amino acid or combination of amino acids. The amino acids which have been shown to produce these results include l-proline, l-asparagine, l-aspartic acid, l-arginine, γ-amino-n-butyric acid, l-alanine, l-glutamine and combinations thereof.

16 Claims, No Drawings

AMINO ACIDS AS DRY BEVERAGE MIX INGREDIENTS

TECHNICAL FIELD

The invention relates to beverages and more particularly to the addition of certain chemical compounds or compositions which have been found to have utility in the alteration of flavor or mouthfeel characteristics of said beverages.

BACKGROUND ART

In the food industry there is a constant demand for the production of additives, whether naturally occurring or synthetic, which are capable of imparting, supplementing or improving the flavor or mouthfeel characteristics of the foodstuffs. It is common in some segments of the industry to add flavor agents to enhance or bring out a desirable characteristic in products and by so doing, render the product more desirable from a consumer preference standpoint.

U.S. Pat. No. 3,395,021 issued to Glicksman et al. teaches a dry fruit flavor beverage mix containing edible acids such as citric, tartaric, adipic, and formic acids. These acids in combination with a gum system produce a product which is similar in flavor and mouthfeel to a fresh fruit beverage. The acids provide tartness in the reconstituted beverage.

U.S. Pat. No. 3,736,150 entitled "Beverage Containing Egg Albumen and Amino Acid" issued to Basso et al. teaches the addition of egg albumen and an amino acid (glycine) to a dry beverage mix, where the egg albumen and glycine are present as the major sources of protein. The glycine also serves an additional function as a flavor enhancer, masking the objectionable egg odor and taste, resulting in a product that is substantially indistinguishable from a similar beverage with all the protein omitted.

U.S. Pat. No. 3,649,298 entitled "Carbonation Concentrates For Beverages and Process of Producing Carbonated Beverages" issued to Kreevoy teaches a dry beverage mix containing n-carboxy-amino acid anhydride in combination with the disodium salts of n-carboxy-amino acid producing a carbonated beverage mix.

U.S. Pat. No. 3,510,310 entitled "Artifically Sweetened Beverages and Mixtures Thereof" issued to Breckwoldt teaches a dry beverage mix comprising an edible water-soluble amino carboxylic acid (e.g. glycine, lysine, methionine, etc.). This mix is reconstituted to provide a beverage having a taste and texture similar to the beverage sweetened with sugar. This invention proports to solve the adverse problem associated with artificially sweetened beverages in overcoming the lack of texture and mouthfeel that is inherent in such a beverage.

On analysis, fruit juices, in particular orange juices are known to contain as much as 9% amino acids on a dry weight total solids basis. The individual amino acids themselves are sweet, sour, bitter or bland. The prior art neither teaches nor appreciates that amino acids are important flavor contributors to the fruit juice, or the possibility that they could be utilized to produce an enhanced flavor impact and an improved mouthful character in a fruit-flavored dry beverage mix at a low level of incorporation.

There has been a constant demand in the food art for the production of a formulated powdered beverage mix which upon reconstitution would contain a flavor and mouthfeel more akin to a real fruit juice.

DISCLOSURE OF THE INVENTION

This invention relates to a method of producing an enhanced flavor impact and an improved mouthfeel character in a dry beverage mix comprising the addition of amino acids. The amino acids which have been shown to produce the enhanced flavor impact and improved mouthfeel character include 1-proline, 1-asparagine, 1-aspartic acid, 1-arginine, γ-amino-n-butyric acid, 1-alanine, 1-glutamine, and combinations thereof. When the fruit-flavored dry beverage mix is orange-flavored, the preferred amino acids are 1-proline, 1-asparagine, 1-arpartic acid, 1-arginine, γ-amino-n-butyric acid and combinations thereof. When the fruit-flavored dry beverage mix is grape-flavored the preferred amino acids are 1-alanine, 1-glutamine, 1-arginine, 1-asparagine and combinations thereof.

The level of incorporation of the amino acids in the dry beverage mix varies from 0.1% to 8%, on a dry weight basis, preferably from 0.5% to 4.5%. When the dry beverage mix is reconstituted, the amino acids will be present at a level of from 0.1 to 8.0 grams per liter on an as-consumed basis, preferably from 0.7 to 6.5 grams per liter. When the fruit-flavored beverage is grape-flavored the levels of incorporation are lower. The level of incorporation of the amino acids in the grape-flavored dry beverage mix varies from 0.1% to 2% on a dry weight basis, preferably from 0.1% to 1.2%. When the grape-flavored dry beverage mix is reconstituted, the amino acids will be present at a level of from 0.1 to 2.9 grams per liter on an as-consumed basis, preferably from 0.2 to 1.7 grams per liter.

The presence of the amino acids in the beverage functions to bring the chemical composition closer to real fruit juice, produce a titration curve closer in shape to that of a real fruit juice and functions to organoleptically produce an overall blending of aromatic flavors and basic tastes which yields a closer resemblance to real fruit juice.

The dry beverage mix in addition to containing the amino acids will contain sweeteners, flavoring agents, clouding agents, dyes, antioxidants, buffering agents, nutritional additives (e.g. vitamins) and other ingredients which have been known to be present in these beverages.

The amino acids previously identified can be added to a ready-to-drink beverage and they will produce an enhanced flavor impact and an improved mouthfeel character in the beverage. However, the amino acids are not long-term storage stable in a ready-to-drink beverage.

The following examples are provided as illustrations of the flavoring composition of the present invention.

EXAMPLE I

An orange-flavored, dry beverage mix was prepared containing the following levels of incorporation of amino acids as represented in Table 1.

TABLE I

| Amino Acid | Control | Sample A | Sample B |
| --- | --- | --- | --- |
| 1-proline | X | 0.600 g. | X |
| 1-asparagine | X | X | 0.400 g. |

The amino acids were added to approximately 67.3 grams of a dry beverage mix such that Sample A contained approximately 0.9% 1-proline on a dry weight basis and Sample B contained approximately 0.6% 1-asparagine on a dry weight basis. The dry beverage mix base contained approximately 35 g. sucrose, 12 g dextrose, 14 g fructose and the remainder of the mix contained food grade acids, buffering agent, clouding agent, artificial color, and artificial flavors. A total of 570 ml. of water was added to each of the dry beverage mixes such that Sample A contained 1 gram per liter of 1-proline and Sample B contained 0.7 grams of 1-asparagine on an as-consumed basis.

Sample A and sample B were then evaluated by a benchtop trained taste panel versus a control beverage which was identical to the samples produced except that no amino acids were incorporated. The panelists reported that sample A had a smoother, fuller flavor impact and improved mouthfeel as compared with the control. This was also accompanied by a slightly salty impact and a sensation that the beverage was slightly mouthcoating. Sample B was not as salty as sample A and it had a flavor impact that was greatly improved over the control with taste panel members noting the presence of some fresh juice-type notes.

EXAMPLE 2

In a similar manner as discussed in Example 1, orange-flavored dry beverage mixes were prepared containing the following levels of incorporation of amino acids as represented in Table II

|  | Weight in grams |
|---|---|
| Sucrose | 7.3 |
| Dextrose | 63.4 |
| Fructose | 63.4 |
| l-alanine | .9 |
| l-arginine | .4 |
| l-asparagine | .2 |
| l-glutamine | .2 |
| Gum Arabic | 2.5 |
| Artifical Color & Flavors and Cloud | .3 |
| KH Tartrate | 3.0 |
| Food Grade Acids | 3.5 |
| Low Methoxy Pectin | .5 |
| Total | 145.6 g |

The above mix was reconstituted with water to produce one liter of beverage. A benchtop trained test panel perceived that this beverage possessed a good sweet/sour balance, low concord grape flavor/aroma and a sour after taste which was described as somewhat grape-juice like.

EXAMPLE 4

An orange-flavored dry beverage mix was prepared which contains the following ingredients.

|  | Weight in grams |
|---|---|
| Sucrose | 62.0 |

TABLE II

| Amino Acid | Control | SAMPLES 1 | 2 | 3 | 4 | 5 | 6 |
|---|---|---|---|---|---|---|---|
| l-proline | X | 0.930 | 0.930 | X | X | X | X |
| l-asparagine | X | 0.620 | X | 0.620 | X | X | X |
| γ-amino-butyric acid | X | 0.930 | X | X | 0.930 | X | X |
| l-arginine | X | 0.409 | X | X | X | 0.409 | X |
| l-aspartic acid | 0.620 | X | X | X | X | X | 0.620 |
| % Amino Acid on Dry weight Basis | 0 | 4.60 | 1.26 | 0.85 | 1.26 | 0.56 | 0.85 |
| Grams Per Liter of Amino Acids (As-Consumed) |  | 0.77 | 0.20 | 0.14 | 0.20 | 0.09 | 0.14 |
| Benchtop Organoleptic Evaluation | sweet then sour, then off-taste, sweet/sour aftertaste | more blended than control, sweet lasts longer, off-taste less than control | full sweet, sour after-taste, less off-taste | sweet all the way through | full, more depth of flavor, sour after-taste very little off-taste | old oranges, slightly chalky off-taste, full | very sour after-taste |

The dry beverage mixes were reconstituted with water and the level of amino acids in each of the samples expressed in grams per liter on an as-consumed basis as reported in Table II.

The last entry in the table is an organoleptic evaluation of a benchtop trained test panel which compared the various samples versus a control which contained no added amino acids. As can be observed from analyzing the results which were obtained, by selecting certain amino acids and various levels of these amino acids it is possible to formulate a dry beverage mix which will accentuate either sweetness, sourness, provide better depth of flavor, or produce a particular beneficial taste impact.

EXAMPLE 3

A grape-flavored dry beverage was prepared which contained the following ingredients.

| Dextrose | 31.0 |
|---|---|
| Fructose | 31.0 |
| Food Grade Acids | 8.1 |
| Potassium Citrate | 3.2 |
| l-proline | 1.7 |
| l-asparagine | 1.2 |
| γ-amino-n-butyric acid | 1.7 |
| l-arginine | .8 |
| l-aspartic acid | 1.2 |
| Vitamin C | .7 |
| Vitamin A | .02 |
| Clouding Agent | 3.1 |
| Xanthan Gum | 0.3 |
| Low Methoxy Pectin | 1.1 |
| Artificial Colors and Flavors | 1.4 |
|  | 148.5 |

The above mix was reconstituted with water to produce one liter of beverage. A trained test panel perceived that this beverage possessed a fleeting green-orange flavor note, a low fresh-squeezed orange juice flavor and a slightly more sour than sweet overall taste perception.

I claim:

1. A method of producing an enhanced flavor impact and improved mouthfeel character in a fruit-flavored beverage which consists essentially of combining with a sugar-sweetened fruit-flavored beverage, an amino acid selected from the group consisting of l-proline, l-asparagine, l-aspartic acid, l-arginine, γ-amino-n-butyric acid, l-alanine, l-glutamine and combinations thereof in an effective amount sufficient to produce an enhanced flavor impact and improved mouthfeel character.

2. A method of producing an enhanced flavor impact and improved mouthfeel character in a fruit-flavored beverage wherein said beverage is reconstituted from a sugar-sweetened, fruit-flavored, dry beverage mix which consists essentially of combining with said dry beverage mix, an amino acid selected from the group consisting of l-proline, l-asparagine, l-aspartic acid, l-arginine, γ-amino-n-butyric acid, l-alanine, l-glutamine and combinations thereof in an effective amount sufficient to produce an enhanced flavor impact and improved mouthfeel character.

3. The method of claim 1 wherein the beverage is a ready-to-drink beverage.

4. The method of claim 2 wherein the amino acid is combined at a level from about 0.1% to about 8% on a dry weight basis.

5. The method of claim 4 wherein the level of amino acid is from about 0.5% to 4.5% on a dry weight basis.

6. The method of claim 3 wherein the amino acid is combined with said beverage at a level of about 0.1 to about 8.0 grams per liter of said beverage on an as-consumed basis.

7. The product produced by the method of claim 1.

8. The method of claim 1 wherein the fruit flavored beverage is orange-flavored.

9. The product produced by the method of claim 8 wherein the amino acid is l-proline.

10. The product produced by the method of claim 8 wherein the amino acid is l-asparagine.

11. The product produced by the method of claim 8 wherein the amino acid is γ-amino-butyric acid.

12. The product produced by the method of claim 8 wherein the amino acid is l-arginine.

13. The product produced by the method of claim 8 wherein the amino acid is l-aspartic acid.

14. The product produced by the method of claim 8 wherein the amino acid is a combination of l-proline, l-asparagine, γ-amino-n-butyric acid, l-arginine and l-aspartic acid.

15. The method of claim 1 wherein the fruit flavored beverage is grape-flavored and the amino acid is selected from the group consisting of l-alanine, l-glutamine, l-asparagine, l-arginine and combinations thereof.

16. The product produced by the method of claim 15.

* * * * *